Nov. 14, 1933.     W. R. STERRETT     1,935,527
APPARATUS FOR FEEDING MOLTEN GLASS
Filed June 17, 1929     2 Sheets-Sheet 1
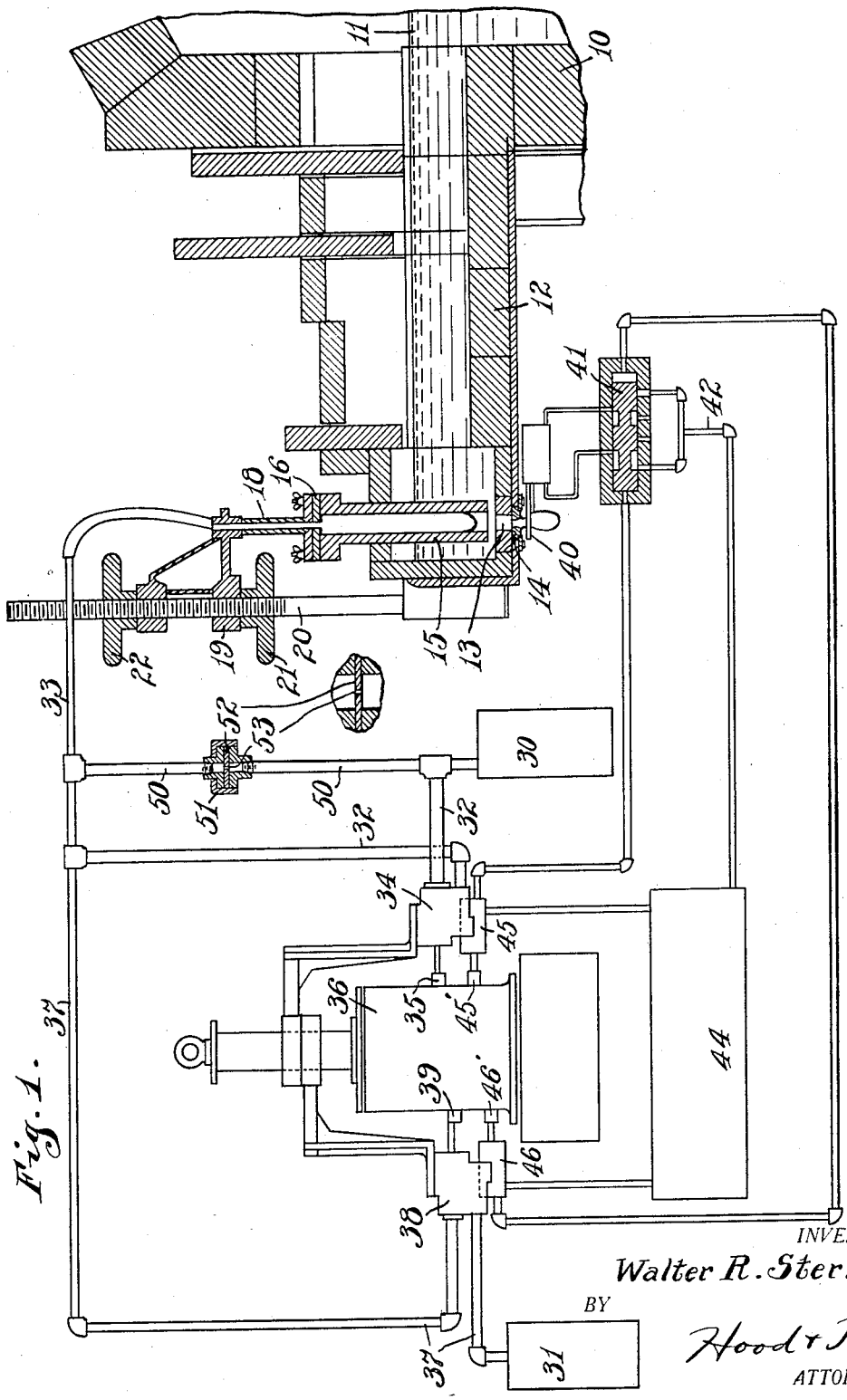
INVENTOR.
Walter R. Sterrett,
BY
Hood & Hahn.
ATTORNEYS

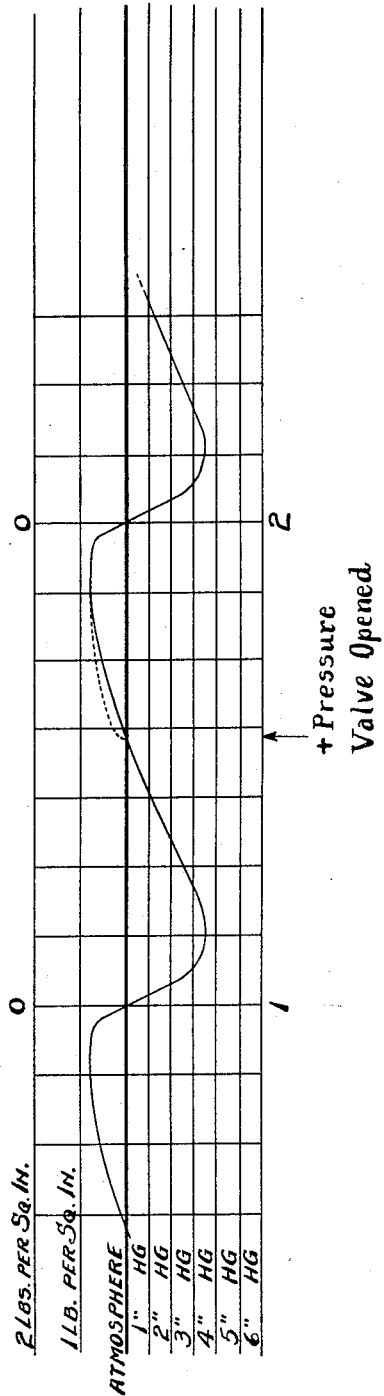

Patented Nov. 14, 1933

1,935,527

UNITED STATES PATENT OFFICE 1,935,527

APPARATUS FOR FEEDING MOLTEN GLASS

Walter R. Sterrett, Muncie, Ind., assignor to Ball Brothers Company, Muncie, Ind., a corporation of Indiana Application June 17, 1929. Serial No. 371,422

1 Claim. (Cl. 49—55)

My invention relates to the art of feeding molten glass through a submerged orifice from a substantially constant supply in such manner as to form successive masses of desired shape and volume which may be readily and satisfactorily severed from the parent body and deposited in successively presented molds of an automatic forming machine.

My invention relates more particularly to that portion of the art of feeding molten glass, wherein the molten glass immediately adjacent the submerged orifice is manipulated through the medium of variations in air pressure within a refractory control tube aligned above the orifice with its lower end submerged in the parent body of molten glass. In the use of apparatus of the above mentioned type gravity flow of the molten glass through the orifice is intermittently accelerated by the establishment of plus air pressure within the upper end of the tube, and is intermittently decelerated by the establishment of minus air pressure within the upper end of the tube, alternate plus and minus air pressure conditions being automatically alternately produced within the tube upon the surface of the limited body of glass immediately above the orifice by mechanism which is synchronized with shearing means arranged below, and slightly vertically separated from the orifice and with a forming machine comprising a plurality of successively presented forming molds.

The object of my present invention is to provide an improved method of manipulation of the glass within the lower portion of the control tube whereby substantial uniformity of successive ejections of glass from the orifice may be maintained through long periods of operation without need of adjustment of the instrumentalities utilized in such manipulation, and to provide a simple apparatus by means of which the improved method may be commercially automatically and mechanically performed, as will be hereinafter more fully disclosed.

The accompanying drawings illustrate diagrammatically my improvements.

Fig. 1 is an elevation, in partial vertical section, of an embodiment of my apparatus; and, Fig. 2 a graph of a cycle of pressure conditions within the control tube.

In the drawings 10 indicates a tank within which body 11 of molten glass is maintained, said tank having one or more flow spouts 12 projecting therefrom, each of said flow spouts having a submerged discharge passage 13 formed through its floor near its outer end, the lower end of said passage being formed by a readily removable refractory orifice block 14. The details of the tank, flow spout, submerged discharge passage and orifice block are well-known in the art and for convenience the flow passage 13—14 will be generally referred to as a submerged orifice.

Vertically aligned above the submerged orifice, with its lower end submerged in the molten glass, is a refractory control tube 15, the external diameter of which preferably exceeds the diameter of passage 13 and the bore of which slightly exceeds the diameter of passage 13. The tube 15 is detachably connected, by an air-tight connection 16, with a tubular head 18 carried by a bracket 19 slidably mounted upon a vertical rod 20 threaded to receive the two nuts 21 and 22 between which bracket 19 is supported, the arrangement being such that the position of the lower end of the tube 15 may be readily adjusted relative to the upper end of passage 13, to thereby determine the average rate of flow of glass from the orifice.

For the purpose of varying the pressure conditions within the tube 15, upon the surface of molten glass which enters the submerged end of the tube, I provide the following mechanism:

A supply of superatmosphere, or plus, air pressure at a substantially uniform pressure is maintained in a tank 30, by any suitable means (not shown), and in a tank 31, by any suitable means (not shown), I maintain a substantially uniform subatmospheric, or minus, air pressure. In practice I have found that a plus air pressure of about three-fourths of a pound per square inch, and a minus pressure of about three and one-half inches of mercury, are satisfactory. Tank 30 is connected by pipes 32 with a pipe 33 which in turn is connected to head 18 and in pipe 32 is a valve 34 alternately opened and closed by a cam 35 on a rotory timer head 36. Tank 31 is connected by pipes 37 to pipe 33 and in pipes 37 is a valve 38 adapted to be actuated by a cam 39 on the timer head 36.

Located below the orifice block 14, and slightly separated therefrom is a shear mechanism 40. I have indicated this shearing mechanism diagrammatically as of the well-known air-actuated type, operation being controlled by means of an air valve 41 which controls flow of actuating air to and from the shear cylinder from the supply pipe 42 connected to the suitable supply 44 of plus pressure air, some of which air is utilized, through the medium of valves 45 and 46 to control the operation of the shear controlling valve 41.

The valves 45 and 46 are actuated by cams 45' and 46', respectively, carried by the timer head 36. Any well-known valve construction (for valves 34, 38, 45 and 46), and any well-known cam construction (for the cams 35, 39, 45' and 46') may be used for the purposes of my invention and these elements are therefore merely illustrated diagrammatically. It will be readily understood that the several cams are so placed, relative to the valves which they actuate, that intermittently and alternately, in regular cycles, connections will be established between the interior of the upper end of tube 15 and tanks 30 and 31, whereby alternate cyclic plus and minus air pressure conditions will be produced upon the limited area of glass within the tube immediately above the submerged orifice and that, as has been well-known in the art for many years, the normal gravity flow of molten glass beneath the lower end of tube 15 and out through the submerged orifice, will thereby be alternately accelerated and decelerated to produce successive charges of molten glass which may, by means of shears, be successively sheared from the parent body.

The apparatus and method thus far disclosed was well-known prior to my invention which, broadly speaking, involves a constant supply of supplemental plus pressure air to the chamber which is defined in part by the segregated surface of the glass within the tube, said supplemental supply being at a limited rate of flow which is continuous and independent of the operations of the valves which establish and disestablish intermittent short duration connections between the interior of the tube and the primary plus and minus air pressures.

The constant supply, at a limited rate of flow, of supplemental plus pressure air to the interior of the tube, which is the essence of my invention, may be obtained in any one of many ways and in the drawings I have shown a very simple means which has proven to be commercially very satisfactory. Forming a bypass, or short circuit for plus pressure air, around valve 34, and between tank 30 and pipe 33, is a pipe 50 comprising two sections connected by an ordinary pipe coupling 51 between the two elements of which I place a thin diaphragm 52 (see the magnified detail) through which is formed a small passage 53 by means of which plus pressure air may flow constantly from tank 30 to the interior of tube 15. The most efficient size for passage 53 will depend upon the character of the piping, the bore of the tube 15, the absolute air pressures within tanks 30 and 31, the source of supply of supplemental plus pressure, the viscosity of the glass, and perhaps a number of other details and must be determined somewhat by experiment, but, as indicating the order of magnitude of passage 53, I have found that, in an apparatus of the general character indicated in the drawings, wherein tube 15 had a bore of three inches, and the piping 32 33 37 is standard one-half to three quarters piping, and the diameter of passage 13 is slightly less than the bore of tube 15, and the plus pressure in tank 30 is three-fourths pound per square inch, and the minus pressure in tank 31 is three and one-half inches of mercury, there will be an efficient functioning of the apparatus when passage 53 is thirteen one-hundred twenty-eights of an inch in diameter.

It will be readily understood that the connections between tanks 30 and 31 and tube 15 through the medium of valves 38 and 34 respectively, may be either short or long and either through the medium of a single pipe 33 (as shown) or by separate connections; and that a direct connection between pipe 50 and tube 15 might be established, or that the supplemental plus pressure air might be supplied from a source separate and distinct from tank 30, without departing from my invention. It will also be understood that there are several available substitutes for the perforated diaphragm 52, the requirement merely being that the rate of flow of the supplemental plus pressure air shall not be so great that suitable minus pressure conditions within tube 15 may not be intermittently established upon opening valve 38, and such that the flow of supplemental plus pressure air should preferably be approximately at such rate that, at the moment of opening of the plus pressure valve 34, the pressure within tube 15 shall have just about reached atmospheric pressure.

So far as my present experience goes, the indications point strongly toward the desirability of the following operations and conditions:

The minus pressure valve should be opened at such a time relative to the shear actuation that the freshly cut stub of glass will be arrested in its downward flow so long as the shears are closed, and perhaps actually moved upwardly slightly; that the plus pressure valve should be opened in time to supplement the gravity flow of glass through the submerged orifice by such an amount as to produce a suspended mass of glass of desired size and volume; that the constant supply of supplemental plus pressure air to the interior of tube 15 should be at such rate that following the time of attainment of maximum minus pressure within the tube 15 there will be a gradual increase of pressure approaching atmospheric pressure; and that the attainment of a pressure about equal to atmospheric pressure within tube 15 should occur at about the time of opening of the plus pressure valve, so that the increase of pressure from maximum minus pressure to maximum plus pressure shall be at a fairly smooth rate, and the minus pressure valve being opened before the plus pressure valve is closed.

The rate of continuous flow of supplemental plus pressure air to the control tube should not be sufficient, within the time between closing of the minus pressure valve and opening of the plus pressure valve, to produce, within tube 15 the maximum desired plus pressure.

As previously stated the precise proportioning of the parts is largely a matter of experiment, subject to the general requirements which have been outlined above, it being desirable to so control the pressure conditions wtihin tube 15 that those conditions may be typically represented by the graph (Fig. 2 of the drawings) wherein the abscissa are plus and minus pressures, the ordinates are time intervals in a cycle operation and the curve is pressure variation upon the surface of glass within the tube 15. It will be noted from this curve that the pressure from maximum minus to maximum plus is continuously increasing. Slight variations in pressure conditions will occur, caused by conditions which I have not yet been able to accurately identify, and in some instances I find that there may be a slight sudden rise in the pressure curve at the moment of opening of the plus pressure valve, as indicated by the dotted line in Fig. 2, but, in the main, the increase in pressure conditions from maximum minus to maximum plus may be represented by a comparatively smooth curve.

I claim as my invention:

A feeder for molten glass comprising a flow spout having a submergible orifice, a control tube arranged above said orifice with its lower end spaced therefrom and below the normal glass level, means for maintaining a supply of air under super-atmospheric pressure, a normally continuously-open rated flow connection between said air pressure means and the upper end of the control tube, means for intermittently establishing and disestablishing a second connection between said air pressure supply and the upper end of the control tube, means within which subatmospheric pressure is maintained, and means for intermittently connecting the upper end of the tube to said subatmospheric means whereby the air pressure within the upper end of the tube may be intermittently cyclically reduced to below atmospheric pressure.

WALTER R. STERRETT.